(12) United States Patent
Yook et al.

(10) Patent No.: US 8,448,321 B2
(45) Date of Patent: May 28, 2013

(54) PRESS-FIT DEVICE

(75) Inventors: Sung-Min Yook, Gyeonggi-do (KR); Sung Hoon Jeong, Seoul (KR); Young Seock Lee, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 515 days.

(21) Appl. No.: 12/615,692

(22) Filed: Nov. 10, 2009

(65) Prior Publication Data

US 2010/0325858 A1 Dec. 30, 2010

(30) Foreign Application Priority Data

Jun. 30, 2009 (KR) ........................ 10-2009-0059077

(51) Int. Cl.
  *B25B 27/14* (2006.01)
  *B23Q 1/00* (2006.01)
  *B23Q 3/00* (2006.01)
  *B23Q 7/04* (2006.01)
  *B21D 39/00* (2006.01)
  *B23P 19/00* (2006.01)

(52) U.S. Cl.
  USPC ................ 29/283.5; 29/283; 29/505; 29/751; 29/517; 29/281.1

(58) Field of Classification Search
  USPC .................. 29/468, 525, 559, 464, 505, 751, 29/517, 281.1–283.5, 700
  See application file for complete search history.

(56) References Cited

U.S. PATENT DOCUMENTS

| | | | | |
|---|---|---|---|---|
| 2,779,590 | A | * | 1/1957 | Seastrom ........................ 226/65 |
| 5,519,928 | A | * | 5/1996 | Hardy .............................. 29/251 |
| 5,619,782 | A | * | 4/1997 | Tanaka et al. ................. 29/407.1 |
| 2002/0148089 | A1 | * | 10/2002 | Frenken ..................... 29/243.53 |
| 2004/0187300 | A1 | * | 9/2004 | Shioda ............................ 29/751 |
| 2005/0155220 | A1 | * | 7/2005 | Ikeda et al. ..................... 29/747 |
| 2006/0096075 | A1 | * | 5/2006 | Robinson et al. .............. 29/521 |
| 2006/0248711 | A1 | * | 11/2006 | Lu et al. ......................... 29/760 |
| 2007/0056161 | A1 | * | 3/2007 | Hanaoka et al. ................ 29/718 |
| 2010/0095518 | A1 | * | 4/2010 | Lee et al. ........................ 29/729 |

FOREIGN PATENT DOCUMENTS

| | | |
|---|---|---|
| JP | 08-141848 A | 6/1996 |
| KR | 1002-00334 B1 | 6/1999 |
| KR | 2008-0090599 A | 10/2008 |

OTHER PUBLICATIONS

"servomechanism." Encyclopædia Britannica. Encyclopædia Britannica Online Academic Edition. Encyclopædia Britannica Inc.<http://www.britannica.com/EBchecked/topic/536030/servomechanism>.*

* cited by examiner

*Primary Examiner* — Monica Carter
*Assistant Examiner* — Seahee Yoon
(74) *Attorney, Agent, or Firm* — Edwards Wildman Palmer LLP; Peter F. Corless

(57) ABSTRACT

A press-fit device includes a base plate, a jig base and a robot mounted on the base plate, a press-fit unit mounted at a portion of the robot, a supporting plate mounted on the jig base, and a supporting block mounted to a side portion of the connecting frame. The supporting plate and block can support repulsive force that can be generated when the press-fit component is press-fitted to the press-fit object.

9 Claims, 5 Drawing Sheets

PRESS-FIT DEVICE

CROSS-REFERENCE TO RELATED APPLICATION

This application claims priority to and the benefit of Korean Patent Application No. 10-2009-0059077 filed on Jun. 30, 2009, the entire contents of which are incorporated herein by reference.

BACKGROUND (a) Technical Field

The present disclosure relates to a press-fit device for use in manufacturing a vehicle.

(b) Related Art

Generally, many components such as a bearing race or a dowel pin are press-fitted to a vehicle engine or transmission by using a press-fit device.

Such press-fit is performed by forcibly inserting a shaft into a hole, diameter of which is smaller than that of the shaft. In this process, thousands of kilogram force is generated as repulsive force.

As a result, types of components that can be assembled by press-fit are limited, and press-fit processes are performed by a specially designed device.

However, the structure of an engine becomes complex and a multiple shift-speed transmission is realized. Accordingly, the number of the components that must be press-fitted increases and press-fit positions and dimensions of such components are diversified. Therefore, there is a need for a press-fit device that can press-fit various components to various positions.

There are press-fit devices using a robot to perform certain processes, e.g., an insertion process. Even with these robot-based devices hardly can resist the repulsive force generated in press-fit.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

A press-fit device according to an exemplary embodiment of the present invention may include a base plate, a jig base, a robot, a press-fit unit, a supporting plate, and a supporting block.

The jig base is mounted on a portion of the upper surface of the base plate. It includes a press-fit supporter for supporting a press-fit object at a predetermined height above the base plate. It also includes a clamper for clamping the press-fit object.

The robot is mounted on another portion of the upper surface of the base plate.

The press-fit unit is mounted through a connecting frame at a front portion of an arm of the robot for gripping a press-fit component so that the press-fit component can be press-fitted to a predetermined position of the press-fit object.

The supporting plate is fixedly mounted on the jig base and the supporting block is fixedly mounted together with the press-fit unit to a side portion of the connecting frame. The supporting plate and block support repulsive force that can be generated when the press-fit component is press-fitted to the press-fit object.

Preferably, the press-fit unit may comprise a servo press, an aligning unit, and a grip tool. The servo press is mounted at the front portion of the arm of the robot through the connecting frame for converting driving torque of a servo motor into press-fit stroke. The aligning unit is mounted at a front portion of the servo press for compensating position error of the robot. The grip tool is mounted at a lower portion of the aligning unit for gripping the press-fit component.

Suitably, the press-fit unit may further comprise a tool exchanger between the aligning unit and the grip tool.

Preferably, the supporting plate may be fixedly mounted on the jig base through a plurality of supporting rods so as to be disposed corresponding to an upper portion of the press-fit object and be provided with a plurality of perforated supporting holes corresponding to the predetermined press-fit position of the press-fit object. Also preferably, the supporting block as well as the press-fit unit being inserted in the supporting hole may be moved to a lower surface of the supporting plate so as to be supported at more than two points of the lower surface of the supporting plate and to transmit the repulsive force generated in press-fit to the supporting plate.

Here, each of the supporting holes may include an insert region in which the supporting block is inserted without interference and a support region at which the supporting block is supported by being interfered at more than two points.

Suitably, the supporting block may be provided with three circumferential supporting ends formed along a circumference of the press-fit unit and an extended supporting end formed at an extended portion which is extended from one side of the supporting block.

DETAILED DESCRIPTION OF THE EMBODIMENTS

Figure 1:
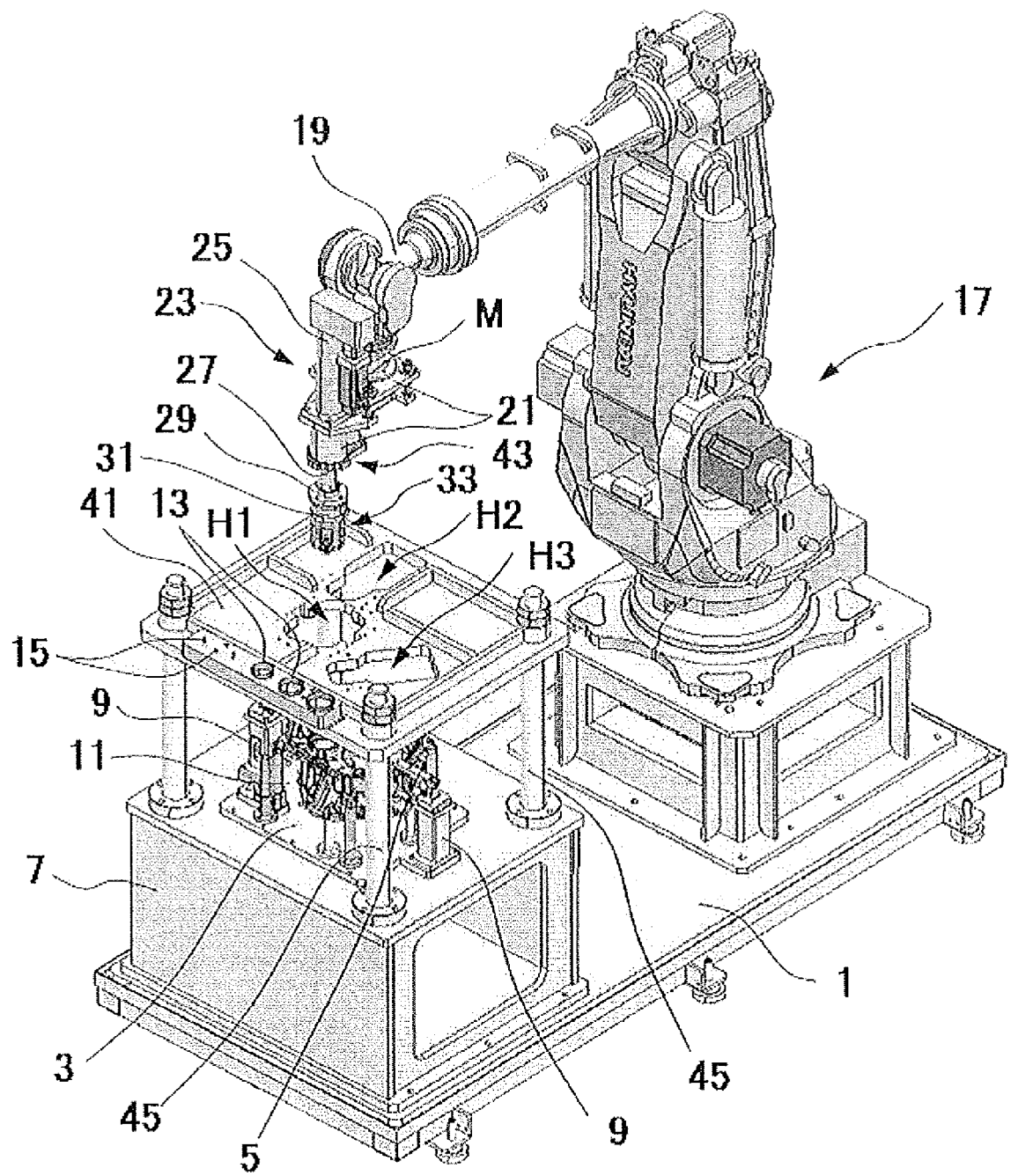
FIG. 1 is a perspective view of a press-fit device according to an exemplary embodiment of the present invention.

Reference will now be made in detail to the preferred embodiment of the present invention, examples of which are illustrated in the drawings attached hereinafter, wherein like reference numerals refer to like elements throughout.

Figure 2:
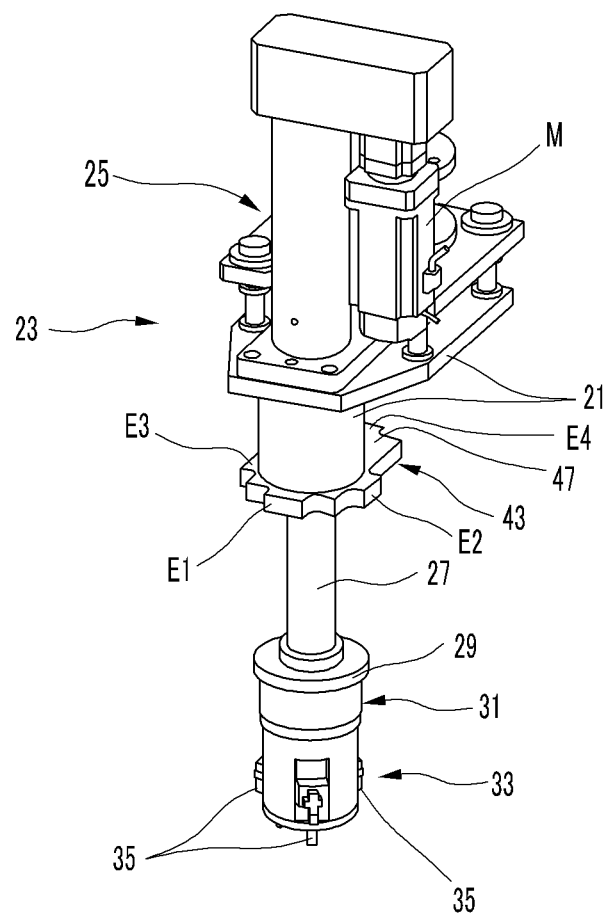
FIG. 2 is a perspective view of a press-fit unit applied to a press-fit device according to an exemplary embodiment of the present invention.
Figure 3:
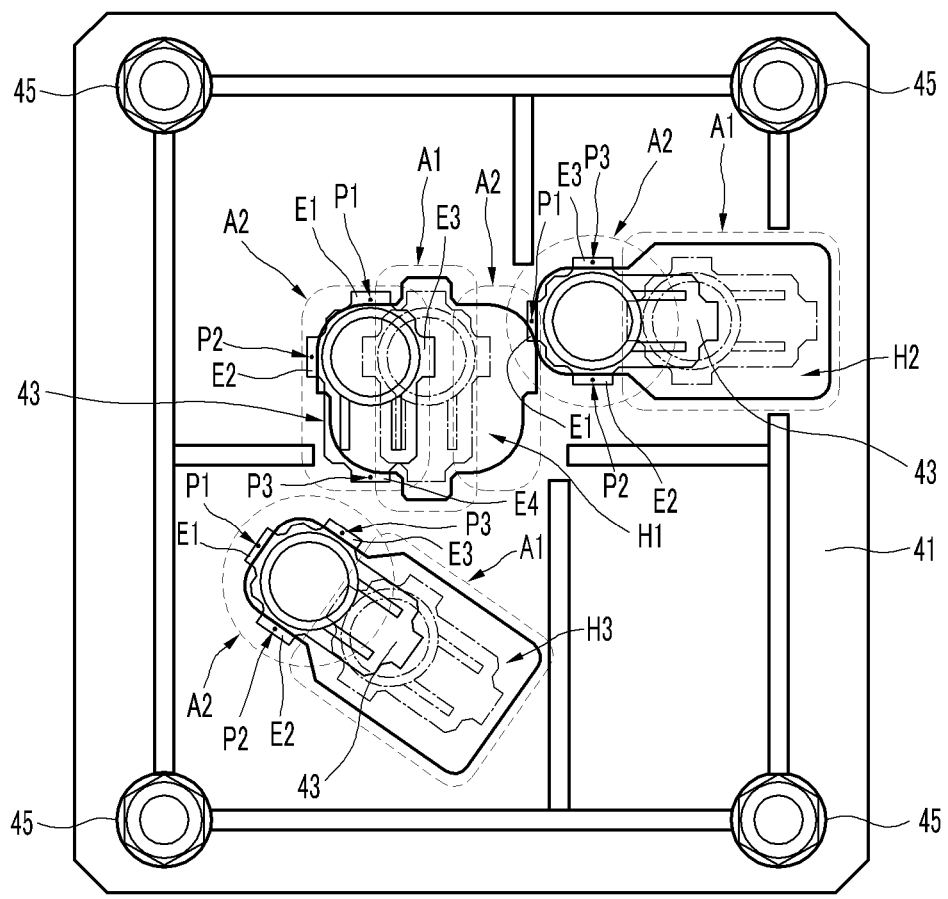
FIG. 3 is a top plan view of a supporting plate applied to a press-fit device according to an exemplary embodiment of the present invention.

FIG. 1 is a perspective view of a press-fit device according to an exemplary embodiment of the present invention; FIG. 2 is a perspective view of a press-fit unit applied to a press-fit device according to an exemplary embodiment of the present invention; and FIG. 3 is a top plan view of a supporting plate applied to a press-fit device according to an exemplary embodiment of the present invention.

A press-fit device according to an exemplary embodiment of the present invention, as shown in FIG. 1, includes a base plate 1 and a jig base 7 provided on the base plate 1.

The jig base 7 includes a press-fit supporter 3 and a clamper 5. The press-fit supporter 3 functions to support an object to which components are press-fitted at a predetermined height from the base plate 1 and the clamper 5 functions to clamp the press-fit object. The press-fit supporter 3 is disposed at a portion of the upper surface of the jig base 7. A plurality of clampers 5 are mounted at the upper portion of the jig base 7 through a clamping cylinder 9.

Here, solely for simplicity and illustration, herein a transmission case 11 is referred to the press-fit object, and a bearing race 13 and a dowel pin 15 are referred to press-fit components.

A multi-joint robot 17 is mounted on another portion of the upper surface of the base plate 1. A press-fit unit 23 for gripping the press-fit component is mounted at a front portion of an arm 19 of the robot 17 through a connecting frame 21 so as to press-fit the press-fit component to a predetermined position of the press-fit object.

Here, the press-fit unit 23, as shown in FIG. 2, includes a servo press 25 mounted at the front portion of the arm 19 of the robot 17 through the connecting frame 21. A ball screw and a ram 27 are provided in the servo press 25 such that rotation speed of a servo motor M is reduced and is converted into rectilinear reciprocating motion. Therefore, the servo press 25 generates a press-fit stroke by using driving torque of the servo motor M. The servo press 25 is small so as to be mounted at the front portion of the arm 19 of the robot 17.

The press-fit unit 23 also includes an aligning unit 29 mounted at a front portion of the ram 27 of the servo press 25 so as to align the press-fit component with a press-fit hole by compensating a position error of the robot 17.

The press-fit unit 23 further includes a grip tool 33 for gripping the press-fit component, which is mounted at a lower portion of the aligning unit 29 through a tool exchanger 31.

Here, a general magnetic-type automatic tool exchanger can be used as the tool exchanger 31, and the grip tool 33 grips or releases the press-fit component according to forward or backward movement of three grippers 35 by pneumatic pressure or hydraulic pressure.

In an embodiment, two or more of the respective grip tools 33 corresponding to types of press-fit components can be replaceably mounted to the aligning unit 29 through the tool exchanger 31. Accordingly, the press-fit device according to an exemplary embodiment of the present invention may press-fit various types of press-fit components to press-fit objects by using flexible movement control of the robot 17.

The press-fit device further includes a supporting plate 41 and a supporting block 43 to support repulsive force that would be generated when the press-fit component is press-fitted to the press-fit object.

The supporting plate 41 is provided at the jig base 7 and the supporting block 43 is provided at the connecting frame 21.

In an embodiment, the supporting plate 41 may be fixed to the upper surface of the jig base 7 through four supporting rods 45 in a state of being disposed corresponding to an upper portion of the press-fit object. The supporting plate 41 may be formed of three perforated supporting holes H1, H2, and H3 corresponding to the press-fit position of the press-fit object, as shown in FIG. 3.

Each of the supporting holes H1, H2, and H3 is provided with an insert region A1 in which the supporting block 43 is inserted without interference and a support region A2 at which the supporting block 43 is supported by being interfered at more than two points.

As shown in FIG. 3, for example, the supporting hole H1 formed at a middle portion of the supporting plate 41 may be used for press-fitting the bearing race 13 to a bearing of a differential gear or an output shaft in the transmission case 11, which is referred herein as the supporting hole H1 for bearing race. In addition, the supporting holes H2 and H3 formed at one side and the other side of the supporting hole H1 for bearing race may be used for press-fitting the dowel pin 15 to an edge of the transmission case 11, which is referred herein as the supporting holes H2 and H3 for dowel pin.

The supporting hole H1 for bearing race is provided with the insert region A1 formed at a middle portion thereof and the support region A2 formed at both sides of the insert region A1. The supporting block 43 as well as the press-fit unit 23 is inserted in the insert region A1, and the supporting block 43 is supported by the support region A2 at three points.

In addition, each of the two supporting holes H1 and H2 for dowel pin is provided with the insert region A1 in which the supporting block 43 as well as the press-fit unit 23 is inserted and the support region A2 at which the supporting block 43 is supported at three points. The width of the insert region A1 is large such that the supporting block 43 as well as the press-fit unit 23 is inserted therein without interference. In addition, the support region A2 is formed at one side of the insert region A1 and the width of the support region A2 is small such that the supporting block 43 can be supported thereby.

Meanwhile, the supporting block 43 as well as the press-fit unit 23 is fixedly mounted at the lower portion of the connecting frame 21 and is inserted through the supporting holes H1, H2, and H3. The supporting block 43 as well as the press-fit unit 23 is moved according to movement of the robot and is supported by a lower surface of the supporting plate 41 at more than two points. Therefore, the supporting block 43 transmits the repulsive force generated in press-fit process to the supporting plate 41.

In an embodiment, the supporting block 43 may include four supporting ends. For example, the supporting block 43 is provided with three circumferential supporting ends E1, E2, and E3 formed along and protruded perpendicularly or substantially perpendicularly from a circumference of the press-fit unit 23 and an extended supporting end E4 formed at an extended portion 47 extended from one side of the supporting block 43 at which the circumferential supporting ends E1, E2, and E3 are not provided.

In this embodiment, two circumferential supporting ends E1 and E2 and one extended supporting end E4 of the supporting block 43 are supported by the supporting hole H1 for bearing race, and three circumferential supporting ends E1, E2, and E3 are supported by the supporting holes H2 and H3 for dowel pin. Therefore, the supporting block 43 inserted in the supporting holes H1, H2, and H3 can be supported at more than three points in the press-fit process.

A press-fit process by using the press-fit device according to an exemplary embodiment of the present invention will be described in detail.

As shown in FIG. 1, the press-fit object (e.g., the transmission case 11) is loaded on the press-fit supporter 3 of the jig base 7 and is clamped by each clamper 5. The grip tool 33 of the press-fit unit 23 mounted at the front portion of the arm 19 of the robot 17 grips the press-fit component (e.g., the bearing race 13).

Figure 4:
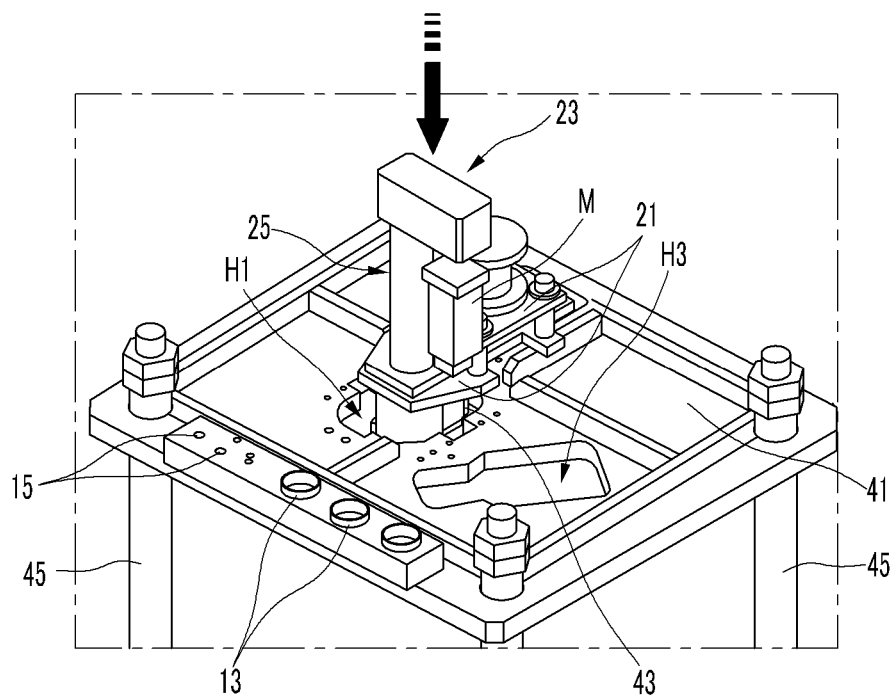
FIG. 4 shows a press-fit process by using a press-fit device according to an exemplary embodiment of the present invention.

After that, the press-fit unit 23, as shown in FIG. 4, is inserted in the supporting hole H1 for bearing race formed on the supporting plate 41 by movement control of the robot 17.

Figure 5:
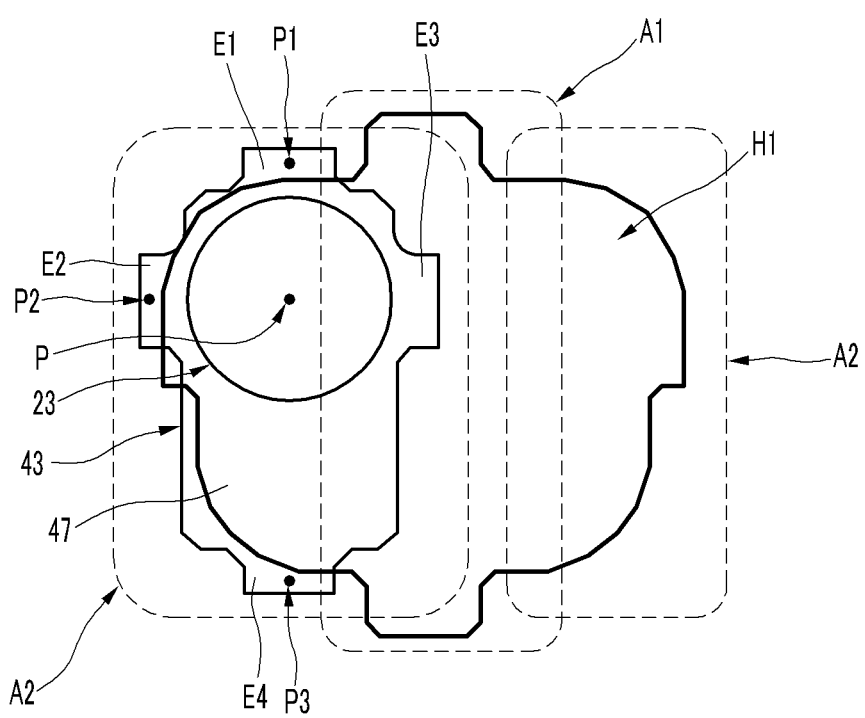
FIG. 5 is a schematic view for showing operation of means for supporting repulsive force applied to a press-fit device according to an exemplary embodiment of the present invention.

The supporting block 43 integrally connected to the connecting frame 21, as shown in FIG. 5, is inserted in the insert region A1 of the supporting hole H1 for bearing race together with the press-fit unit 23.

After that, the robot 17 moves the press-fit unit 23 to the press-fit position P in a state that the press-fit unit 23 is inserted in the supporting hole H1 for bearing race. Two circumferential supporting ends E1 and E2 and the extended supporting end E4 of the supporting block 43, as shown in FIG. 5, are overlapped with the supporting hole H1 for bearing race. Therefore, the supporting block 43 is supported by the three supporting points P1, P2, and P3.

At this state, the servo motor M of the servo press 25 is driven and the press-fit stroke is transmitted to the aligning unit 29 through the ram 27. Then, the aligning unit 29 aligns the bearing race 13 gripped by the grip tool 33 with press-fit hole of the press-fit position, and thereafter press-fit process is performed.

The repulsive force generated in the press-fit process is not transmitted to the arm 19 of the robot 17 through the supporting block 43 integrally connected to the connecting frame 21, but is supported by three supporting points P1, P2, and P3 located at the lower surface of the supporting hole H1 for bearing race.

Therefore, the repulsive force that is larger than the payload of the robot 17 is not transmitted to the robot 17, and thus various types of the press-fit components can be press-fitted by using the robot 17.

The press-fit device according to an exemplary embodiment of the present invention has advantages described as follows.

The supporting plate and the supporting block are interposed between the jig base provided with the press-fit supporter clamping the press-fit object and the press-fit unit mounted at the front portion of the robot arm such that the repulsive force is not transmitted to the robot when the press-fit component is press-fitted to the press-fit object as a consequence that each supporting end of the supporting block is supported by the lower surface of the supporting hole in the supporting plate at more than three points.

In addition, since various types of the grippers are replaceably mounted to the press-fit unit through the tool exchanger, various types of components can be press-fitted by using flexible movement control of the robot.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A press-fit device comprising:
   a base plate;
   a jig base mounted on a portion of an upper surface of the base plate and including a press-fit supporter for supporting a press-fit object at a predetermined height above the base plate and a clamper for clamping the press-fit object;
   a robot mounted on another portion of the upper surface of the base plate;
   a press-fit unit mounted through a connecting frame at a front portion of an arm of the robot for gripping a press-fit component so that the press-fit component can be press-fitted to a predetermined position of the press-fit object;
   a supporting plate fixedly mounted on the jig base; and
   a supporting block fixedly mounted together with the press-fit unit to a side portion of the connecting frame, wherein the supporting plate and block support repulsive force that can be generated when the press-fit component is press-fitted to the press-fit object such that the repulsive force is not transmitted to the arm of the robot,
   wherein the press-fit unit comprises:
   a servo Press mounted at a front portion of the arm of the robot through the connecting frame for converting driving torque of a servo motor into press-fit stroke;
   an aligning unit mounted at a front portion of the servo press for compensating position error of the robot;
   a grip tool mounted at a lower portion of the aligning unit for gripping the press-fit component; and
   a tool exchanger between the aligning unit and the grip tool.

2. The press-fit device of claim 1, wherein the supporting plate is fixedly mounted on the jig base through a plurality of supporting rods so as to be disposed corresponding to an upper portion of the press-fit object and is provided with a plurality of perforated supporting holes corresponding to the predetermined press-fit position of the press-fit object, and wherein the supporting block as well as the press-fit unit being inserted in the supporting hole is moved to a lower surface of the supporting plate so as to be supported at more than two points of the lower surface of the supporting plate and transmit the repulsive force generated in press-fit to the supporting plate.

3. The press-fit device of claim 2, wherein each of the supporting holes includes an insert region in which the supporting block is inserted without interference and a support region at which the supporting block is supported by being interfered at more than two points.

4. The press-fit device of claim 2, wherein the supporting block is provided with three circumferential supporting ends formed along a circumference of the press-fit unit and an extended supporting end formed at an extended portion which is extended from one side of the supporting block.

5. The press-fit device of claim 3, wherein the supporting block is provided with three circumferential supporting ends formed along a circumference of the press-fit unit and an extended supporting end formed at an extended portion which is extended from one side of the supporting block.

6. A press-fit device comprising;
   a base plate;
   a jig base mounted on a portion of an upper surface of the base plate and including a press-fit supporter for supporting a press-fit object at a predetermined height above the base plate and a clamper for clamping the press-fit object;
   a robot mounted on another portion of the upper surface of the base plate;
   a press-fit unit mounted through a connecting frame at a front portion of an arm of the robot for gripping a press-fit component so that the press-fit component can be press-fitted to a predetermined position of the press-fit object;
   a supporting plate fixedly mounted on the jig base;
   a supporting block fixedly mounted together with the press-fit unit to a side portion of the connecting frame, wherein the supporting plate and block support repulsive force that can be generated when the press-fit component is press-fitted to the press-fit object;
   a servo press mounted at a front portion of the arm of the robot through the connecting frame for converting driving torque of a servo motor into press-fit stroke;
   an aligning unit mounted at a front portion of the servo press for compensating position error of the robot;
   a grip tool mounted at a lower portion of the aligning unit for gripping the press-fit component; and
   a tool exchanger between the aligning unit and the grip tool.

7. A press-fit device comprising:
a base plate;
a jig base mounted on a portion of an upper surface of the base plate and including a press-fit supporter for supporting a press-fit object at a predetermined height above the base plate and a clamper for clamping the press-fit object;
a robot mounted on another portion of the upper surface of the base plate;
a press-fit unit mounted through a connecting frame at a front portion of an arm of the robot for gripping a press-fit component so that the press-fit component can be press-fitted to a predetermined position of the press-fit object;
a supporting plate fixedly mounted on the jig base;
a supporting block fixedly mounted together with the press-fit unit to a side portion of the connecting frame, wherein the supporting plate and block support repulsive force that can be generated when the press-fit component is press-fitted to the press-fit object;
wherein the supporting plate is fixedly mounted on the jig base through a plurality of supporting rods so as to be disposed corresponding to an upper portion of the press-fit object and is provided with a plurality of perforated supporting holes corresponding to the predetermined press-fit position of the press-fit object, and wherein the supporting block as well as the press-fit unit being inserted in the supporting hole is moved to a lower surface of the supporting plate so as to be supported at more than two points of the lower surface of the supporting plate and transmit the repulsive force generated in press-fit to the supporting plate.

8. The press-fit device of claim 7, wherein each of the supporting holes includes an insert region in which the supporting block is inserted without interference and a support region at which the supporting block is supported by being interfered at more than two points.

9. The press-fit device of claim 7, wherein the supporting block is provided with three circumferential supporting ends formed along a circumference of the press-fit unit and an extended supporting end formed at an extended portion which is extended from one side of the supporting block.

\* \* \* \* \*